United States Patent [19]

Williams et al.

[11] Patent Number: 5,041,310

[45] Date of Patent: Aug. 20, 1991

[54] PROCESS FOR UNIFORM COATING OF POLYMER PARTICLES WITH AN ADDITIVE

[75] Inventors: Joel L. Williams, Cary; Jane C. Graper, Durham, both of N.C.

[73] Assignee: Becton, Dickinson and Company, Franklin Lakes, N.J.

[21] Appl. No.: 541,698

[22] Filed: Jun. 21, 1990

[51] Int. Cl.$^5$ .............................................. B05D 7/24
[52] U.S. Cl. ................................ 427/222; 427/398.1; 524/92; 524/102; 524/108; 524/369
[58] Field of Search ................. 427/222, 385.5, 393.5, 427/398.1; 523/207; 524/99, 102, 108, 369, 394, 400; 264/134

[56] References Cited

U.S. PATENT DOCUMENTS

| | | | |
|---|---|---|---|
| 4,371,645 | 2/1983 | Mahaffey, Jr. | 524/108 |
| 4,613,639 | 9/1986 | Blum et al. | 524/251 |
| 4,668,721 | 5/1987 | Seltzer et al. | 524/99 |
| 4,708,979 | 11/1987 | Pedrazzetti et al. | 524/99 |
| 4,749,734 | 6/1988 | Williams et al. | 524/102 |
| 4,757,102 | 7/1988 | Ravichandran et al. | 524/99 |
| 4,785,034 | 11/1988 | Gaku et al. | 524/99 |
| 4,808,650 | 2/1989 | Titus et al. | 524/108 |
| 4,845,137 | 7/1989 | Williams et al. | 524/108 |
| 4,880,859 | 11/1989 | Slongo et al. | 524/91 |
| 4,960,644 | 10/1990 | Hyche et al. | 427/222 |

Primary Examiner—Michael Lusignan
Assistant Examiner—Terry J. Owens
Attorney, Agent, or Firm—Richard E. Brown

[57] ABSTRACT

A process for coating polymer particles with an additive includes preparing a liquid composition comprising one or more desired additives and a gelling agent in an oil. The composition is coated onto the polymer particle by any convenient procedure. On cooling the coated particle below the gelling point, the composition gels providing a polymer particle having a uniform coating of the additives which is suitable for direct introduction into a mold.

20 Claims, No Drawings

PROCESS FOR UNIFORM COATING OF POLYMER PARTICLES WITH AN ADDITIVE

BACKGROUND OF THE INVENTION

1. Field of the Invention

The present invention relates to molding of plastics, and more particularly relates to a process for applying an even coating of an additive to a polymeric particle.

2. Background of the Invention

Hydrocarbon plastics generally require one or more additives to make them suitable for most applications. For example, plastics such as polystyrene, polyvinyl chloride, polyethylene and polypropylene require stabilizing additives for protection against heat, ultraviolet light, ozone and the like when fabricated into conventional molded and extruded products.

U.S. Application Ser. No. 362,999, of common assignee herewith, discloses a polyolefin composition which includes the polyolefin, a liquid mobilizer, a radiation stabilizer and a clarifier for the polyolefin and an article made from the composition.

Additives for plastics are often combined in an additive package containing a variety of materials necessary for the specific application or to impart particular properties. In the prior art, additive packages have been included in plastics by a variety of multistep blending processes designed to produce a uniform distribution of the additive prior to fabrication. Polymer particles obtained from the polymerization equipment have been dry blended with P 1639 the additive package. This procedure, however, often leads to uneven coatings. In other methods, the package has been taken up in a solvent and the solvent solution applied by a typical dipping or spraying procedure. This method has the obvious disadvantage of requiring removal of the solvent. Alternatively, the package can be emulsified and the emulsion applied to the polymer pellets by dipping or spraying. This method of course requires removal of the water.

Many additive packages include an oil, and the oil causes another problem in that oils frequently do not wet the surface of the polymer particles uniformly. Migration of the oil on the polymer particles leads to beading and uneven application of the additive package.

For the above reasons, prior art methods for blending additives to polymers to be molded have generally included melting the polymer as obtained from the polymerizer, mixing the melt thoroughly with the additive and extruding and pelletizing the melt prior to introduction into a molding unit. A typical prior art process including blending an additive package, melting, extruding and pelletizing prior to injection molding is disclosed in U.S. Pat. No. 4,785,034 to Gaku et al.

It is evident that this multistep process is time consuming and uneconomical, particularly for the large scale processing of plastics common today. Accordingly, there is a need for a method to uniformly coat polymer particles as they are received from a polymerizer and charge them directly to a mold without the need for any intermediate operations. The present invention addresses this need.

SUMMARY OF THE INVENTION

In a process for uniformly coating a polymer particle with an additive, the additive and a gelling agent are dissolved in an oil to give a coating composition. The composition may be coated onto the particle by spraying or dipping and the coated particle cooled to cause the composition to gel. Alternatively, the composition may be sprayed onto a cold particle so that the gellation occurs on contact, or the composition may be gelled prior to coating, and the polymer particle and the gelled composition tumbled together to achieve uniform coating.

Preferred additives are light stabilizers, such as hindered piperidines and polyolefin clarifiers such as sorbitol derivatives. Preferred oils are hydrocarbon oils such as mineral oil and preferred gelling agents are salts of fatty acids. A particularly preferred additive is a dibenzylidene sorbitol clarifier which additionally serves as the gelling agent.

Thus, the invention provides a process whereby polymer particles received directly from the polymerization apparatus may be uniformly coated with an additive package without the steps of melting, extruding and pelletizing required by prior art coating processes prior to molding. Significant savings in time and labor are achieved resulting in more economical molding operations.

DETAILED DESCRIPTION

While this invention is satisfied by embodiments in many different forms, there will herein be described in detail preferred embodiments of the invention, with the understanding that the present disclosure is to be considered as exemplary of the principles of the invention and is not intended to limit the invention to the embodiments described. The scope of the invention will be measured by the appended claims and their equivalents.

In accordance with the present invention, a polymer particle is uniformly coated with an additive composition including an oil and a gelling agent prior to being introduced directly into a mold. Uniformity of the coating is achieved by coating the particle with the composition in liquid form and then providing conditions conducive to gellation. When the composition gels, it ceases to be mobile, and the coating remains uniform and in place when the coated particle is charged to the mold.

In accordance with the present invention, the polymers employed are semi-crystalline polymers having a crystalline content from about 20% to 90%, preferably from about 40% to 80%. The polymer may be comprised of one, two or more monomers, with the term polymer generically referring to homopolymers and to copolymers (comprised of two or more monomers).

Preferred polymers are polyvinyl chloride, polystyrene and various polyolefins, such as polyethylene and polypropylene. The preferred polymer of the invention is polypropylene having a particle size range of 0.01 to 10, preferably about 0.05 to 5, most preferably about 0.1 to 3 mm.

The additive composition of the present invention includes a liquid mobilizing oil as disclosed in U.S. Pat. No. 4,749,734 to Williams et al. Suitable mobilizing oils may be hydrocarbon oils, halogenated hydrocarbon oils, phthalic ester oils, vegetable oils and silicone oils. A preferred oil is mineral oil present in the composition in about 0.5 to 7% percent by weight. (All percentages in this disclosure are by weight unless otherwise stated.) When the composition contains mineral oil within this range, the percentage of mobilizing oil distributed evenly across the polymer mass after molding is maintained within a preferred range of 0.01 to 20%.

A preferred additive in the composition is an additive for stabilizing the polymer against heat, light and radiation. While the invention contemplates inclusion of any stabilizer as known in the art which is compatible with the mobilizing oil, a preferred stabilizer is a hindered amine, preferably a hindered piperidine. Hindered piperidine stabilizers are well-known, and representative suitable examples are disclosed in the aforementioned U.S. Pat. No. 4,749,734.

The most preferred hindered amine stabilizer is a hindered bis(4-piperidinyl)diester of a dicarboxylic acid. Representative examples of bis(hindered piperidinyl)diesters acceptable for use in the present invention, but not limited thereby, are the following: bis(2,2,6,6-tetramethyl-4-piperidinyl)-sebacate; bis(1,2,2,6,6-pentamethyl-4-piperidinyl)-2-n-butyl-2-(3,5-di-tert-butyl 4-hydroxybenzyl)malonate; and bis(1,2,2,6,6-pentamethyl-4-piperidinyl)sebacate. These hindered piperidines are commonly referred to as TINUVIN 770, TINUVIN 144, and TINUVIN 292, respectively, and are available from the Ciba-Geigy Corporation.

The percentage of hindered piperidine stabilizer present in the composition may be about 0.01 to 5% so that the final molded polymer contains about 0.01 to 1.0%.

Other conventional stabilizing additives suitable for inclusion in the composition are, for example, benzotriazoles, phosphite derivatives, thiodipropionates, thiocarbamates and amine sulfides. Another class of useful stabilizers are the hindered phenol antioxidants of the kind commonly used in polyolefins, for example, the GOODRITE® series of vinyl plasticizers available from B. F. Goodrich Chemical Company.

The invention also contemplates inclusion of other conventional polymer additives as known in the art, such as fillers, pigments, antioxidants, flow aids, flatting agents, preservatives, radiopaque agents and clarifiers in the composition. Preferred clarifiers are sorbitol derivatives which in addition to their clarifying properties, have gelling properties as described below.

A wide range of organic gelling agents may be used in for the composition. Suitable gelling agents are salts of carboxylic acids such as p-tertiary butylbenzoic acid. Preferred acid salts are metal salts of long chain fatty acids such as stearic acid and 12 hydroxy stearic acid. The metal ion of these salts may be an alkali metal or an alkaline earth metal.

Preferred gelling agents in accordance with the invention are ethers of polyhydroxy compounds such as mannitol, pentaerythritol and sorbitol. Particularly preferred gelling agents are dibenzyl sorbitol, dibenzylidene sorbitol (DBS) and ring substituted derivatives thereof such as 4,4'-dimethyl dibenzylidene sorbitol (MDBS) and 4,4'-bis(methylthio)dibenzylidene sorbitol (MTDBS). As known in the art, these compounds are clarifying agents for polymeric compositions, and when included in the additive composition of the invention, they serve as the gelling agent and also provide clarity to the final molded polymer. Suitable dibenzylidene sorbitols are disclosed in U.S. Pat. No. 4,371,645 to Mahaffey and U.S. Pat. Nos. 4,808,650 and 4,845,137 to Titus et al. and may be included in the composition at a concentration of about 0.05 to 1%.

Coating of the polymer particle with the additive composition containing the gelling agent may be carried out by any convenient technique. The composition, above its gelling point, may be sprayed onto the polymer particle at a temperature such that the particle is coated with the liquid composition. It is evident that the particle may also be coated by dipping into the liquid composition. On cooling the coated particle below the gelling point, the gelling agent causes the composition to solidify on the particle into a uniform solid coating which does not migrate when the particle is charged into a mold. Alternatively, the liquid composition may be sprayed onto particles which have been cooled to a temperature such that the liquid composition gels immediately on contacting the cooled particle. In still another coating process, the composition may be cooled until it gels, the particle added and tumbled with the gelled composition to effect coating.

Regardless of the method used to coat the particles with the composition, the coated particles may be charged directly into a mold and formed into an article of any desired shape, preferably a medical article such as a catheter or syringe, having the additives of the composition blended uniformly throughout the article.

The following examples are provided to further illustrate the invention but are not to be considered as limitative of the invention.

EXAMPLE I

The following are representative additive compositions of the invention which were gelled onto a polymeric substrate by the procedure of Example II to give a uniform stable coating suitable for direct introduction into a mold.

|  | Concentration, wt. % |
| --- | --- |
| I Additive |  |
| 1. Tinuvin TM 770 | 0.1 |
| 2. Mineral Oil | 4.7 |
| 3. Sodium Stearate | 0.25 |
| 4. MDBS | 0.25 |
| II Additive |  |
| 1. Goodrite ® 3114* | 0.1 |
| 2. Mineral Oil | 4.7 |
| 3. Sodium Stearate | 0.25 |
| 4. DBS | 0.25 |
| III Additive |  |
| 1. Tinuvin TM 770 | 0.1 |
| 2. Mineral Oil | 4.7 |
| 3. Sodium Stearate | 0.25 |
| 4. MTDBS | 0.25 |

*tris-(3,5-ditertiarybutyl-4-hydroxybenzyl)-isocyanurate

EXAMPLE II

General Coating Procedures

A. A uniform additive composition of the invention was prepared by dissolving the components in the mineral oil with stirring and heating to about 250° C., until a homogeneous mixture was obtained, usually about 1 to 5 minutes. The mixture was sprayed onto polymer particles maintained at about 25° C., taking care to insure that the particles were completely coated with the composition. Gelation occurred almost instantly when the hot composition contacted the cold particles.

B. The homogeneous mixture of A was allowed to gel while cooling to room temperature. The gelled mixture was tumbled with polymer particles for about 5 minutes to coat the particles.

What is claimed is:

1. A process for uniformly blending an additive onto a polymer particle comprising:

a) preparing a liquid coating composition for a polymer comprising a stabilizer, a gelling agent and mineral oil;
b) applying said composition to a surface of said polymer; and
c) causing said solution to gel on said surface.

2. The process of claim 1 wherein said polymer is selected from the group consisting of polystyrene, polyvinylchloride and polyolefin.

3. The process of claim 1 wherein said stabilizer is a light stabilizer.

4. The process of claim 1 wherein said stabilizer is a radiation stabilizer.

5. The process of claim 1 wherein said stabilizer is a heat stabilizer.

6. The process of claim 1 wherein said stabilizer is selected from the group consisting of a hindered piperidine, hindered phenol, phosphite, thiodipropionate, amine sulfide, thiocarbamate and benzetriazole.

7. The process of claim 1 wherein said composition further comprises an additive for a polymer selected from the group consisting of a plasticizer, antioxidant, filler, flow aid, flatting agent preservative, pigment and radiopaque agent.

8. The process of claim 1 wherein said gelling agent is selected from the group consisting of an ether of a polyhydroxy compound and a fatty acid salt.

9. The process of claim 8 wherein said polyhydroxy compound is selected from the group consisting of sorbitol, pentaerythritol and mannitol.

10. The process of claim 9 wherein said ether of sorbitol is selected from the group consisting of dibenzyl sorbitol, dibenzylidene sorbitol and ring substituted derivatives thereof.

11. The process of claim 1 wherein said applying step is performed by dipping, spraying or tumbling.

12. The process of claim 11 wherein said composition is liquid during said applying step and said causing step is performed by cooling said composition on said surface.

13. A process for uniformly blending an additive onto a polymer particle comprising preparing a coating composition for a polymer comprising an oil, an additive for said polymer and a gelling agent and applying said composition to the surface of a polymeric particle.

14. The process of claim 13 wherein said oil is selected from the group consisting of hydrocarbon oils, halogenated hydrocarbon oils, phthalic ester oils, vegetable oils and silicone oils.

15. The process of claim 13 wherein said composition is liquid during said applying step and is thereafter caused to gel by cooling.

16. The process of claim 13 wherein said composition is caused to gel and said applying step is performed by tumbling the gelled composition with the particle.

17. A process for uniformly blending an additive onto a polyolefin particle comprising:
a) preparing a liquid coating composition for a polyolefin comprising a solution of a hindered piperidine stabilizer and a sorbitol gelling agent in mineral oil;
b) coating a particle of said polyolefin with said solution; and
c) causing said solution to gel.

18. The process of claim 17 wherein said sorbitol gelling agent is a dibenzylidene sorbitol having clarifying properties.

19. The process of claim 17 wherein said causing step is performed by cooling the coated particle.

20. The process of claim 17 wherein said coating and causing steps are combined by precooling said particle prior to said coating step.

* * * * *